Aug. 15, 1939.  F. OBERMEIT  2,169,707
PEELING MACHINE FOR POTATOES, ETC
Filed June 15, 1937
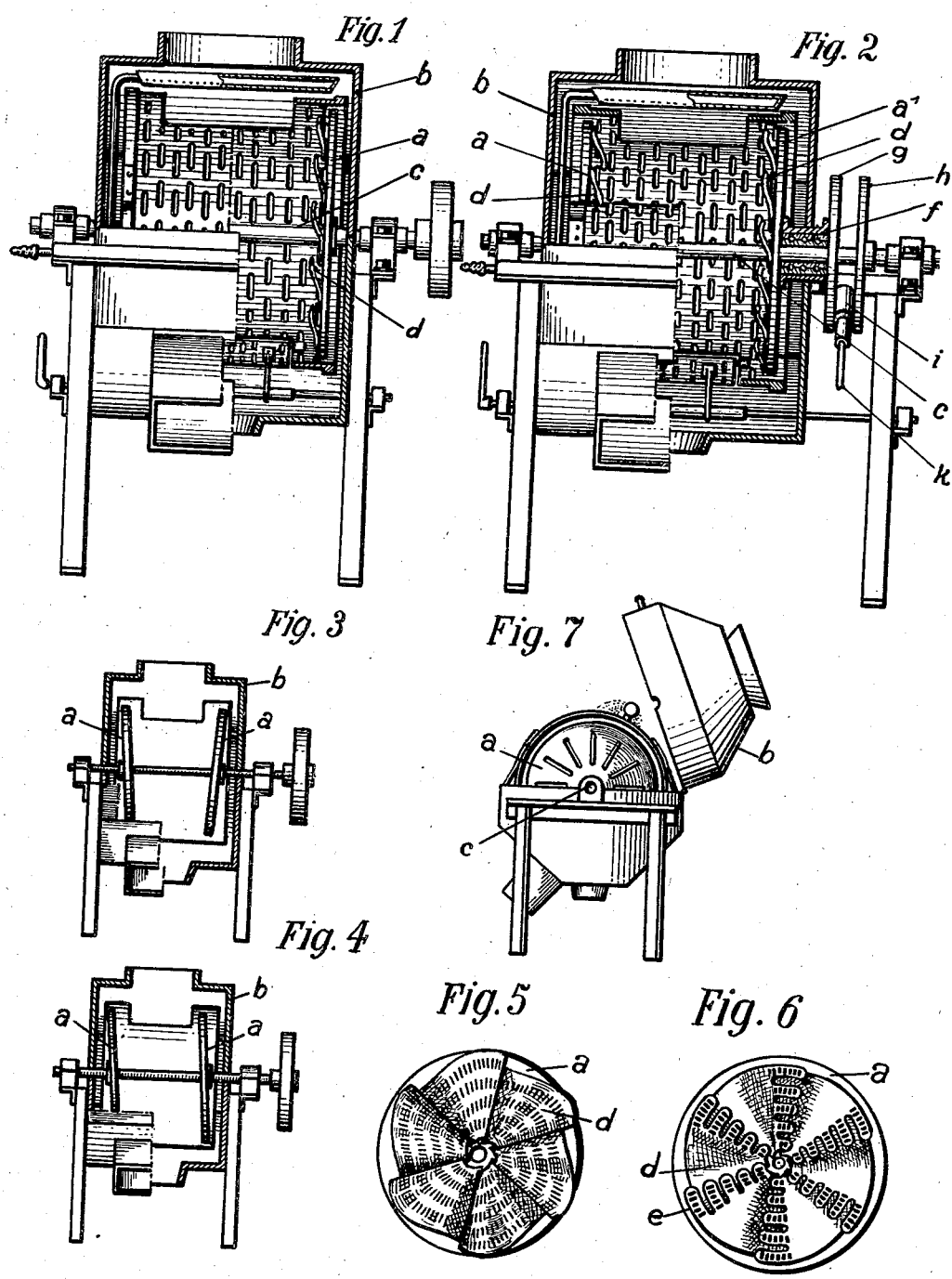

Patented Aug. 15, 1939

2,169,707

UNITED STATES PATENT OFFICE 2,169,707

PEELING MACHINE FOR POTATOES, ETC.

Fritz Obermeit, Leipzig, Germany

Application June 15, 1937, Serial No. 148,279
In Germany June 17, 1936

3 Claims. (Cl. 146—49)

This invention relates to a peeling machine for potatoes and similar tuberous and rhizocarpous plants.

In a peeler according to the invention sectorial rubbing surfaces are arranged on spaced oppositely disposed peeling discs which rotate in a vertical plane in a fixed drum about a horizontal shaft. The sectorial rubbing surfaces, which may terminate in fingers, are arched and overlap one another, so that during rotation of the peeling discs they continually and simultaneously rake the potatoes, etc., turn them about and roll them toward the peeling discs. To increase this raking action the peeling discs, in one embodiment of the invention, are of the swaying type and, in another embodiment, are arranged for rotation in opposite directions to prevent knocking and hurling of the potatoes, etc.

Peelers, in which the peeling discs rotate in spaced relation to one another in a vertical plane on a horizontal shaft, are known. It is further known to provide sectorlike rubbing faces on the peeling discs in such machines. Compared with these known types of peelers the machine according to the invention affords the advantage that owing to the cooperation of the vertical spaced peeling discs with the curvature of the overlapping sectorial rubbing faces arranged thereon the potatoes, etc., are raked and turned about in a more rapid manner and kept in uniform contact with the rubbing faces, whereby the peeling operation is considerably accelerated and improved. Only a very thin peel is rubbed off, so that waste is reduced, whilst the rotation of the peeling discs in opposite directions prevents knocking and hurling of the potatoes, etc., which are always kept at uniform speed at the base of the drum near the lower portion of the peeling discs.

By way of example, the invention is illustrated in the accompanying drawing, in which Figure 1 is a cross section of the device with the peeling discs rotating in the same direction; Fig. 2, a cross section thereof with the peeling discs rotating in opposite directions; Figs. 3 and 4 are detail views showing the swaying suspension of the peeling discs; Figs. 5 and 6 are detail views of the peeling discs with the rubbing sectors provided thereon; and Fig. 7 is a side elevation.

Referring to the drawing, the peeling discs $a'$ are vertically rotatably arranged at a suitable distance from one another on the horizontal shaft $c$ which is disposed in the stationary perforated drum $b$. On the discs $a'$ (Figs. 5 and 6) sectorial rubbing faces $d$ are provided which are arched and overlap one another and may possess fingerlike extensions $e$, as indicated in Fig. 6. Fig. 3 shows the peeling discs $a$ in opposite arrangement. In the construction according to Fig. 4 the discs $a$ are swingingly disposed parallel to one another.

Fig. 2 shows the means for causing rotation of the peeling discs $a$, $a'$ in opposite directions. The disc $a$ is fixed to the horizontal shaft $c$, and the disc $a'$ is pushed upon the shaft $c$ by means of a bushing $f$ and can freely rotate. Firmly connected with the bushing $f$ and the shaft $c$ are the driving pulleys $g$ and $h$ between which a driving roller $i$ is provided which is adjustable and fixable relative to the driving shaft so as to vary the gearing at will.

As this drive causes rotation of the peeling discs $a$, $a'$ in opposite directions, knocking and hurling of the potatoes, etc., are prevented which are only rolled from one disc to the other, turned about and not damaged in any manner. Furthermore, the peeling discs may rotate in opposite directions at any speed without interfering with the proper carrying out of the peeling process.

The driving pulleys $g$, $h$ and the roller $i$ are assumed to be frictional elements in the embodiments shown, though they may of course be also of the toothed type.

I claim:

1. A peeling machine for tuberous and rhizocarpous plants, particularly potatoes, comprising a machine frame, a cylindrical receiving drum for the plants to be peeled stationarily disposed in said frame, a rotatable driving shaft arranged in said frame and within said drum, vertical peeling discs of smaller diameter than the diameter of the drum secured on said shaft in said drum at a distance from each other somewhat smaller than the diameter of the drum and forming the end faces of the drum, and overlapping curved sectional elements with abrading surfaces positioned on the inside of the peeling discs and operating on the surface of the plants to peel the same.

2. In a device according to claim 1 means for driving the peeling discs in opposite directions.

3. A device according to claim 1, wherein the peeling discs are inclined relative to one another and formed as swaying discs.

FRITZ OBERMEIT.